April 5, 1938.   R. J. DEMERS   2,113,016
PROCESS OF REMOVING GLASS AND PUTTY FROM SASH
Filed Feb. 2, 1938   2 Sheets-Sheet 1

INVENTOR.
BY Rene J. Demers
Gardner W. Pearson
ATTORNEY.

Patented Apr. 5, 1938

2,113,016

UNITED STATES PATENT OFFICE 2,113,016

PROCESS OF REMOVING GLASS AND PUTTY FROM SASH

Rene J. Demers, Lawrence, Mass.

Application February 2, 1938, Serial No. 188,316

3 Claims. (Cl. 90—11)

This invention is a process of removing glass and putty from a window sash. It can be carried out when the window frame is in place in a building or when removed therefrom. Usually the glass is held in place in a rectangular rabbet in a window sash by means of putty which is usually on the outside and exposed to the elements. After a while, the oil in the putty dries out and it becomes very hard and sticks with great tenacity to the surface of the glass and to the side face of the rabbet.

If a window is broken or if for any reason it is desired to remove the glass, and to replace it with another pane, the putty must be removed without injuring the sash. As the putty is much harder than a wooden sash and extends from a thin edge at the side of the sash rabbet down to the surface of the glass, it is very difficult to remove it with a chisel, knife or similar tool.

While a pane of glass is intended to fit in the rabbet fairly close, practically it cannot be a perfect fit and consequently when the soft putty is first applied, it works down outside the edges of the glass at certain points between the glass and the side face of the rabbet and hardens there. If a new pane of glass is to be substituted, this remnant of putty must be removed because no two panes are exactly the same size and shape.

My invention is, by the use of a saw or two saws, to first saw a relatively thin groove down through the putty next to the side of the rabbet as far as the surface of the glass; to then remove the glass with the putty which adheres to it; to then saw down to the bottom of the rabbet; and to then remove all the remaining putty.

The two sawings can be accomplished with a suitable hand saw, with two power saws of different depth guides, or preferably with a single power saw provided with two convenient depth guides.

In the drawings, Fig. 1 is an elevation of a window sash with a pane of glass in position but without putty. This view is broken to show the four sides.

Figure 1:
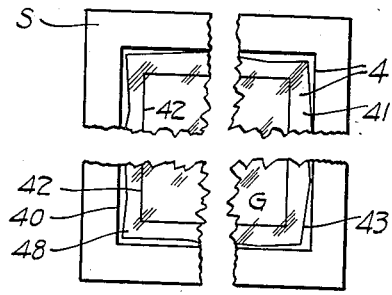
Figure 2:
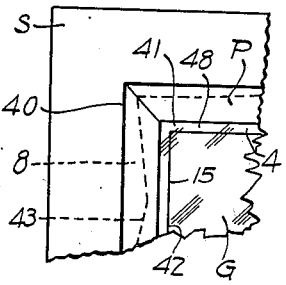
Fig. 2 is an elevation showing part of the same frame shown in Fig. 1 after the putty has been applied.
Figure 3:
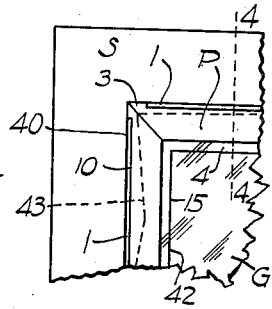
Fig. 3 is a view similar to Fig. 2 showing the first saw cut in the process of removing the putty.
Figure 4:
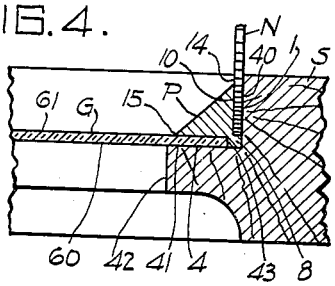
Fig. 4 is an enlarged sectional elevation on line 4—4 of Fig. 3.

In the drawings, S represents any standard or regular type of window sash in which is a right angular rabbet 4 which extends all the way around on what is usually the outside or weather side of the window.

In forming rabbet 4, a rib or ridge 41 is left, with a bottom face 48 against which the bottom or inside face 60 of a pane of glass G rests.

The other face 40 of rabbet 4 is at a right angle to 48 and the inside edge of rib 41 is indicated by 42.

The outside edge of a glass pane G is represented by 43 and while of substantially rectangular shape, the edges are not straight, so that while it must be of a size to fit inside the rabbet 4, there is always a space left between its outer edge 43 and the side face 40 of the rabbet.

Figure 5:
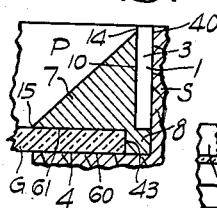
Fig. 5 is an enlarged detail of one part of Fig. 4.

When the putty P is put in place, it generally slopes from the edge 14 up near the top of the side face 40 down to an edge 15 on the top or outside face 61 of the glass and it also fills in between edge 43 and the face 40 as shown at 8. This putty P becomes very hard and my process of removing the glass and the putty is as follows:

With any suitable saw such as N, preferably of the circular type, either driven by hand or power, the saw being relatively thin, and of less width than the putty between 14 and 15, I cut the groove 1 from the top edge 14 close to side face 40 down to a line substantially level with the surface 61 of the glass G. This is shown clearly in Fig. 5.

Figure 6:
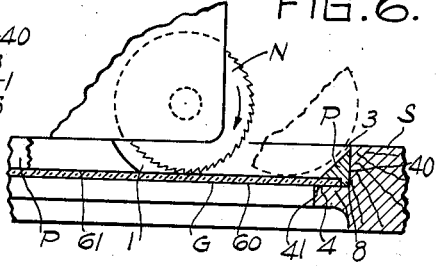
Fig. 6 is a diagrammatic longitudinal section with parts broken away to show how a circular saw makes the first cut.

The action of the saw is shown in Fig. 6 and it may be observed that, as shown by the dotted lines near each corner, there is a small amount of putty 3 which the groove 1 does not reach.

Figure 7:
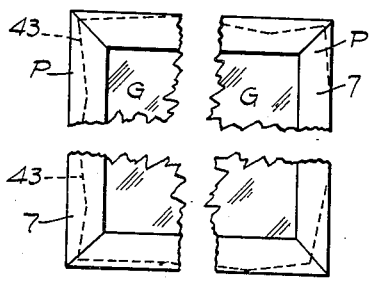
Fig. 7 is an elevation similar to Fig. 1 of the glass after it is removed from the frame with putty adhering.

However, after the first cut has been made, it is easy to lift out the glass, as shown in Fig. 7, carrying with it that part of the putty 7 which lies between the inside face 10 of cut 1 and the edge 15.

Figure 8:
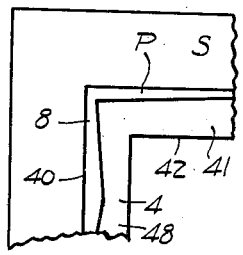
Fig. 8 is a view similar to Fig. 2 of the frame and the putty left on the frame after the glass has been removed.
Figure 9:
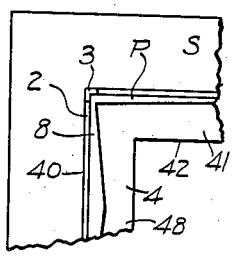
Fig. 9 is a view similar to Figs. 3 and 8 showing the second saw cut.
Figure 10:
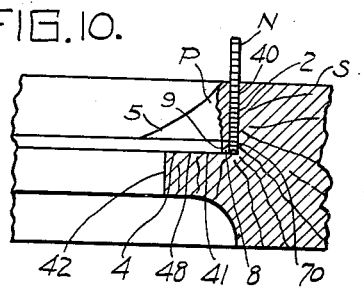
Fig. 10 is a view similar to Fig. 4 showing in sectional elevation the second saw cut.

As shown in Fig. 8, there is now left in the rabbet 4 an irregular line of hard putty 8 and I then, with the same or with a different saw, cut the second groove 2 which, as shown in Fig. 10, goes right down to the bottom face 48 of rabbet 4. After this is done, it leaves an exceedingly narrow and fragile remnant of putty 9 inside the edge 70 of groove 2 and what was the outside edge 43 of the glass. As a matter of fact, the irregularity of this edge is comparatively small and this second cut usually almost entirely removes it, except in the corners 5, and the last remnants 5 and 9 of the putty can easily be removed by a chisel, a screw driver, or even by hand.

Figure 11:
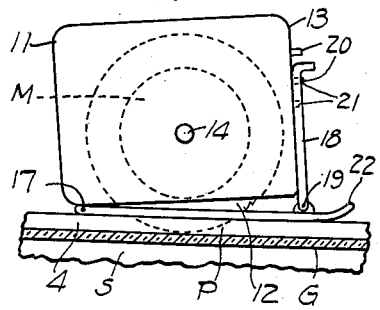
Fig. 11 is a diagrammatic side elevation showing part of a power tool with a circular saw and an adjustable depth guide.
Figure 12:
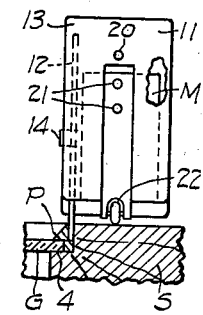
Fig. 12 is an elevation as from the right of Fig. 11 showing diagrammatically the different parts.

In Figs. 11 and 12, I show a power saw 12 carried by a drive shaft 14 operated by a motor M, both carried by the casing 11. To adjust the different depths for the first and second cuts, I show a depth guide 22 pivoted at 17 and adjustable by means of member 18 pivoted at 19 and provided with two holes 21, 21 either or both of which can be engaged with pins 20, 20 fixed to the front 13 of casing 11.

Figure 13:
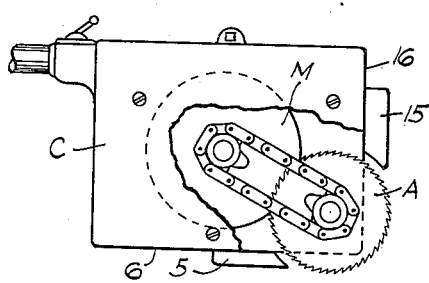
Fig. 13 is a side elevation of a power tool with a circular saw and two depth guides.

Another type of power tool, shown diagrammatically in Fig. 13, is shown and described in the application for United States Letters Patent, filed by me July 12, 1935, Power tool for removing old putty, Serial No. 31,016, copending herewith, in which there is a circular saw A driven by an electric motor M, the saw being so positioned with reference to the two faces 6 and 16 of the casing C that it projects from the face 6 a distance equal to the depth of the first cut and from the face 16 a distance equal to the second cut. As shown, this has the two direction guides 5 and 15 to keep the saw going in the right direction.

Figure 14:
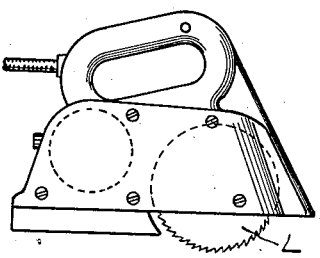
Figs. 14 and 15 are side elevations of power tools, each with a circular saw, the two views showing the saws set at different depths.
Figure 15:
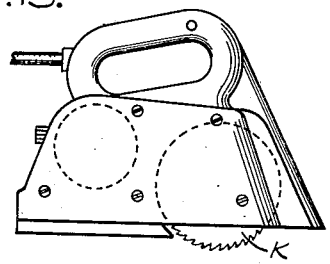

I might, however, also use a power saw shown in the patent to Harrison, Portable electric hand saw, March 31, 1925, No. 1,531,930, indicated at L in Fig. 14 and K in Fig. 15. These are both power driven circular saws, the saw in Fig. 15 being set deeper than the one in Fig. 14.

Figure 16:
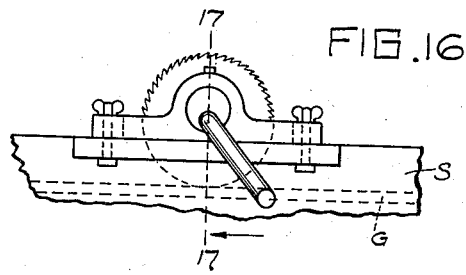
Fig. 16 is an elevation of a hand operative circular saw.
Figure 17:
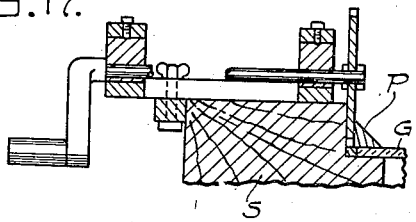
Fig. 17 is a diagrammatic view as on the line 17—17 of Fig. 16 showing the first saw cut and the putty.

I can also use a hand driven circular saw such as is shown in Figs. 16 and 17, similar to what is shown in the patent to Casey, Sash tool or the like, December 28, 1920, No. Re. 15,016, except that the saw is thinner.

By making the saw thinner in every case, I find it is not necessary to use direction guides such as shown by Harrison as when once started, the saw groove itself will keep the saw headed in the right direction.

Figure 18:
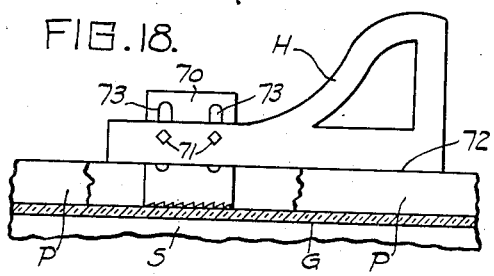
Fig. 18 is a view similar to Fig. 6 showing the use of a hand saw, which is not circular, being used in my process.

As a matter of fact, my process can be carried out by means of a hand saw H such as is shown in Fig. 18, the saw proper 70 being vertically adjustable by means of slots 73 and bolts 71 with reference to the bottom face of guide 72 so that the cuts can be made of different depths or, obviously, the cuts could be made by using two similar saws of different depth adjustments, or even by using two saws which were not similar.

In fact, my process can be carried out by sawing a thin groove which is of less width than the putty next to the side face of the rabbet and the sash down to the level or near the level of the surface of the glass, upon which the glass and the remaining putty can be removed and if there is any putty left in the corners or outside the edges, this can be easily removed by a chisel or other tool or by hand.

I claim:

1. The process of removing glass and putty from the rectangular rabbet of a window sash which consists of first sawing a groove into and of less width than the putty next to the side face of the rabbet, such groove being substantially perpendicular to the glass, down to proximate the surface of the glass; of then removing the glass with the putty which adheres thereto; of then sawing a second groove in extension of the first groove and next to the side face of the rabbet down through the remaining putty to the bottom face of the rabbet; and of then removing whatever putty remains in the rabbet.

2. The process of removing glass and putty from the rabbet of a window sash which consists of first sawing a groove into and of less width than the putty next to the side face of the rabbet, down to proximate the surface of the glass; of then removing the glass with the putty which adheres thereto; of then sawing next to the side face of the rabbet down through the remaining putty to the bottom face of the rabbet; and of then removing whatever putty remains in the rabbet.

3. The process of removing glass and putty from the rabbet of a window sash which consists of first sawing a groove into and of less width than the putty next to the side face of the rabbet, down to proximate the surface of the glass; of then removing the glass with the putty which adheres thereto; and of then removing whatever putty remains in the rabbet.

RENE J. DEMERS.